United States Patent [19]
O'Herron et al.

[11] Patent Number: 6,038,915
[45] Date of Patent: Mar. 21, 2000

[54] AUTOMATED TESTING APPARATUS AND METHOD, ESPECIALLY FOR FLEXIBLE WALLED CONTAINERS

[75] Inventors: Michael R. O'Herron, Williamsburg; John A. Loebach, Toano; Greg A. Whitehead, Newport News, all of Va.

[73] Assignee: QuesTech Packaging, Inc. Liquidating Trust, Washington, D.C.

[21] Appl. No.: 08/901,431

[22] Filed: Jul. 25, 1997

[51] Int. Cl.[7] ........................................ G01M 3/34
[52] U.S. Cl. .............................. 73/49.3; 73/41.3
[58] Field of Search .................. 73/40.5 R, 41.3, 73/49.3, 52

[56] References Cited

U.S. PATENT DOCUMENTS

| | | |
|---|---|---|
| 3,307,390 | 3/1967 | Behrens et al. . |
| 4,117,718 | 10/1978 | Hayward ...................................... 73/52 |
| 4,404,162 | 9/1983 | Miki et al. ................................ 264/514 |
| 4,539,836 | 9/1985 | Haster et al. ............................. 73/49.3 |
| 4,756,184 | 7/1988 | Reishus et al. ........................... 73/49.3 |
| 4,836,764 | 6/1989 | Parkinson ................................. 425/384 |
| 4,997,691 | 3/1991 | Parkinson ................................ 428/35.7 |
| 5,029,464 | 7/1991 | Lehmann .................................. 73/49.3 |
| 5,091,231 | 2/1992 | Parkinson ................................. 426/366 |
| 5,226,316 | 7/1993 | Mally et al. .............................. 73/49.3 |
| 5,614,661 | 3/1997 | Balordi ..................................... 73/49.3 |

*Primary Examiner*—Max H. Noori
*Attorney, Agent, or Firm*—Reed Smith Shaw & McClay LLP

[57] ABSTRACT

Apparatus and methods whereby flexible walled containers may be automatically pressure tested at a pressure testing station for the purpose of determining the presence of defective containers. Detected defective containers may thereafter be transported to an ejector station and ejected physically from their respective supporting tray. The pressure testing station is provided with an array of pressure testing heads which are moveable reciprocally towards and away from the containers while supported in their tray. Each of the pressure testing heads thus makes sealing contact with the rim of an individual respective one of the containers supported in the tray. The ejector station is provided with an array of ejector assemblies equal in number to the number of containers supported on a tray and oriented at an angle relative to a vertical cross-machine plane. If a container is determined to be defective (i.e., will not achieve and/or maintain a predetermined pressure condition when a pressurizing fluid, such as pressurized air, is introduced into the container at the pressure testing station), a controller will issue a signal corresponding to that one of the ejector assemblies which is in registry with the detected defective container. Selective activation of that one ejector assembly will therefore cause an ejector foot to come into contact with the side wall of the defective container thereby forcing the container downwardly through the tray.

22 Claims, 8 Drawing Sheets

6,038,915

AUTOMATED TESTING APPARATUS AND METHOD, ESPECIALLY FOR FLEXIBLE WALLED CONTAINERS

FIELD OF INVENTION

The present invention relates generally to automated testing apparatus and methods which are capable of determining whether a tested container is defective (e.g., due to the presence of a hole in the container side wall). In preferred embodiments, the present invention is embodied in testing apparatus and methods whereby rimmed containers having flexible side walls may individually and reliably be pressure-tested in-line with any detected defective container thereafter being removed automatically from the process line.

BACKGROUND AND SUMMARY OF THE INVENTION

Container manufacturers typically subject their containers to leak testing for quality control purposes. In this regard, the automated testing of containers generally by pressurizing the interior volume of the container and detecting any pressure decay (which decay would be indicative of a defective container—e.g., a hole) is well known, as evidenced by U.S. Pat. No. 3,307,390 to Behrens et al. Problems are encountered, however, when attempts are made to employ prior techniques to pressure-test rimmed containers having flexible side walls.

In this regard, flexible walled containers which are supported by a rim structure, such as the deep drawn containers manufactured in accordance with U.S. Pat. Nos. 4,836,764; 4,997,691 and 5,091,231 each issued to Keith Parkinson (the entire content of each being expressly incorporated hereinto by reference), cannot be reliably sealed along their rim due to its relatively small size and possible uneven surface configuration. As a result, the container may not be capable of being pressurized using conventional techniques.

Furthermore, the flexible side wall of the containers makes it difficult to eject the containers in the event a leak is detected. That is, the typical flexible walled container is usually supported by the container rim in a tray structure with the flexible side wall dependently extending through the supporting tray. This form of manufacturing arrangement makes it difficult to extract the defective container individually from the tray without disturbing neighboring non-defective containers.

What has been needed in this art, therefore, are apparatus and methods whereby flexible-walled containers may be pressure-tested for purposes of quality control with any detected defective containers being individually ejected following such pressure testing. It is towards providing such apparatus and methods that the present invention is directed.

The present invention therefore generally includes apparatus and methods whereby flexible walled containers may be automatically pressure tested at a pressure testing station for the purpose of determining the presence of defective containers. Detected defective containers may thereafter be transported to an ejector station and ejected physically from their respective supporting tray. In such a manner, any detected defective containers may be removed from the process line prior to final processing (e.g., packing, palletizing, shipping and/or subsequent handling).

Most preferably, the pressure testing station is provided with an array of pressure testing heads which are moveable reciprocally towards and away from the containers while supported in their tray. Each of the pressure testing heads thus makes sealing contact with the rim of an individual respective one of the containers supported in the tray. A lower support structure is most preferably moved into contact with the tray simultaneously with the movement of the testing heads so as to counteract the force of the testing heads against the tray and thereby prevent the tray from bowing in the cross-machine direction.

The ejector station is provided with an array of ejector assemblies equal in number to the number of containers supported on a tray and oriented at an angle relative to a vertical cross-machine plane. If a container is determined to be defective (i.e., will not maintain a predetermined pressure condition when a pressurizing fluid, such as pressurized air, is introduced into the container at the pressure testing station), a controller will issue a signal corresponding to that one of the ejector assemblies which is in registry with the detected defective container. Selective activation of that one ejector assembly will therefore cause an ejector foot to come into contact with the side wall of the defective container thereby forcing the container downwardly through the tray.

In this regard, the ejector foot asymmetrically contacts the container side wall when it is in its extended position due to the angular orientation of the ejector assemblies. This asymmetric contact therefore imparts an asymmetric downward force on the container rim in a region generally opposite the contact region between the ejector foot and the container side wall, thereby causing the container rim to collapse inwardly. As a result, the entire container is capable of being pushed physically through the tray.

These and other aspects and advantages of the present invention will become more clear from the following detailed description of the preferred exemplary embodiments thereof which follow.

BRIEF DESCRIPTION OF THE DRAWINGS

Reference will hereinafter be made to the accompanying drawings wherein like reference numerals throughout the various FIGURES denote like structural elements, and wherein.

DETAILED DESCRIPTION OF THE PREFERRED EXEMPLARY EMBODIMENTS

Figure 1:
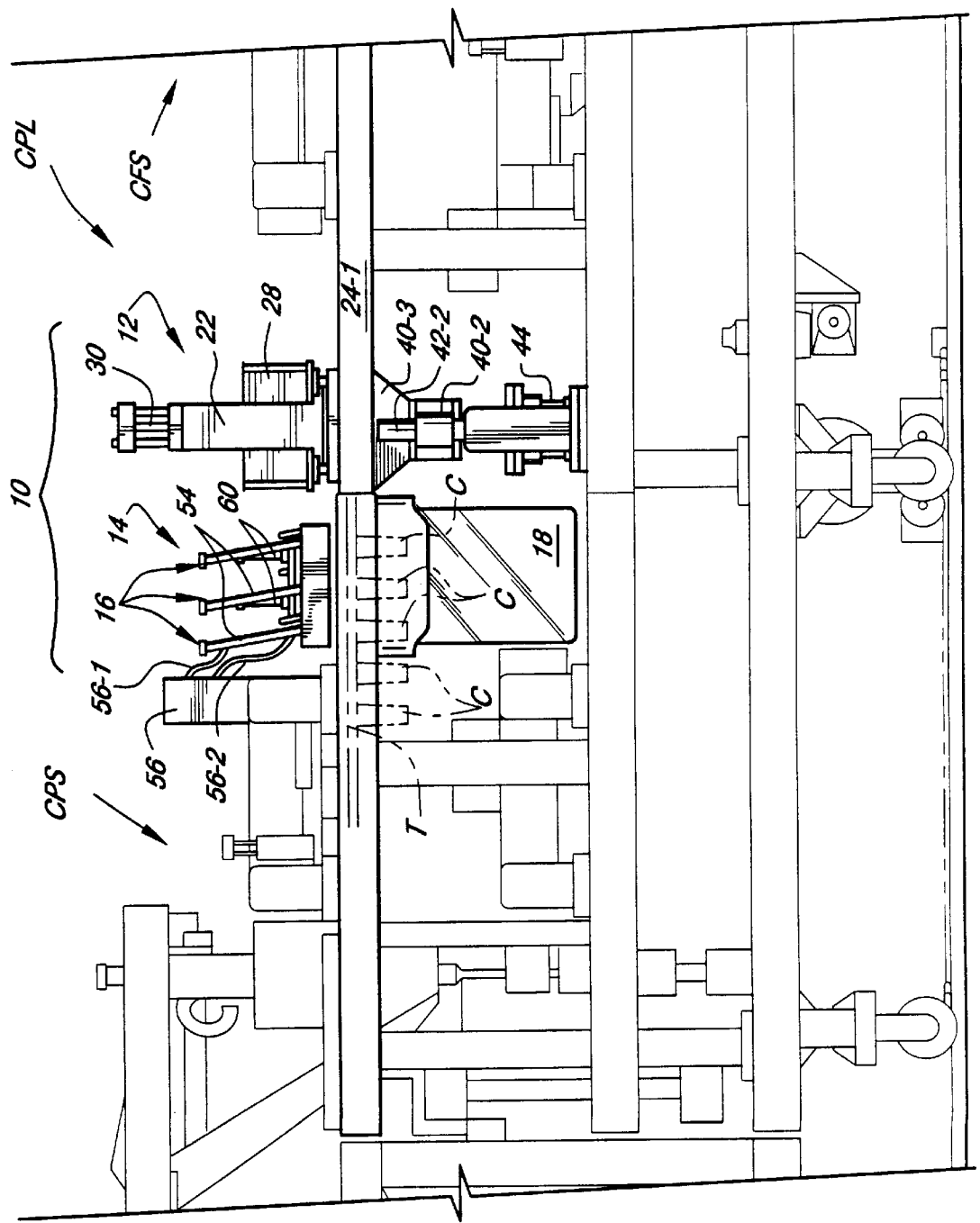
FIGS. 1 and 2 are respectively a side elevational view and a top plan view showing a pressure testing station and a container ejection station in accordance with the present invention in a process line for flexible walled containers.
Figure 2:
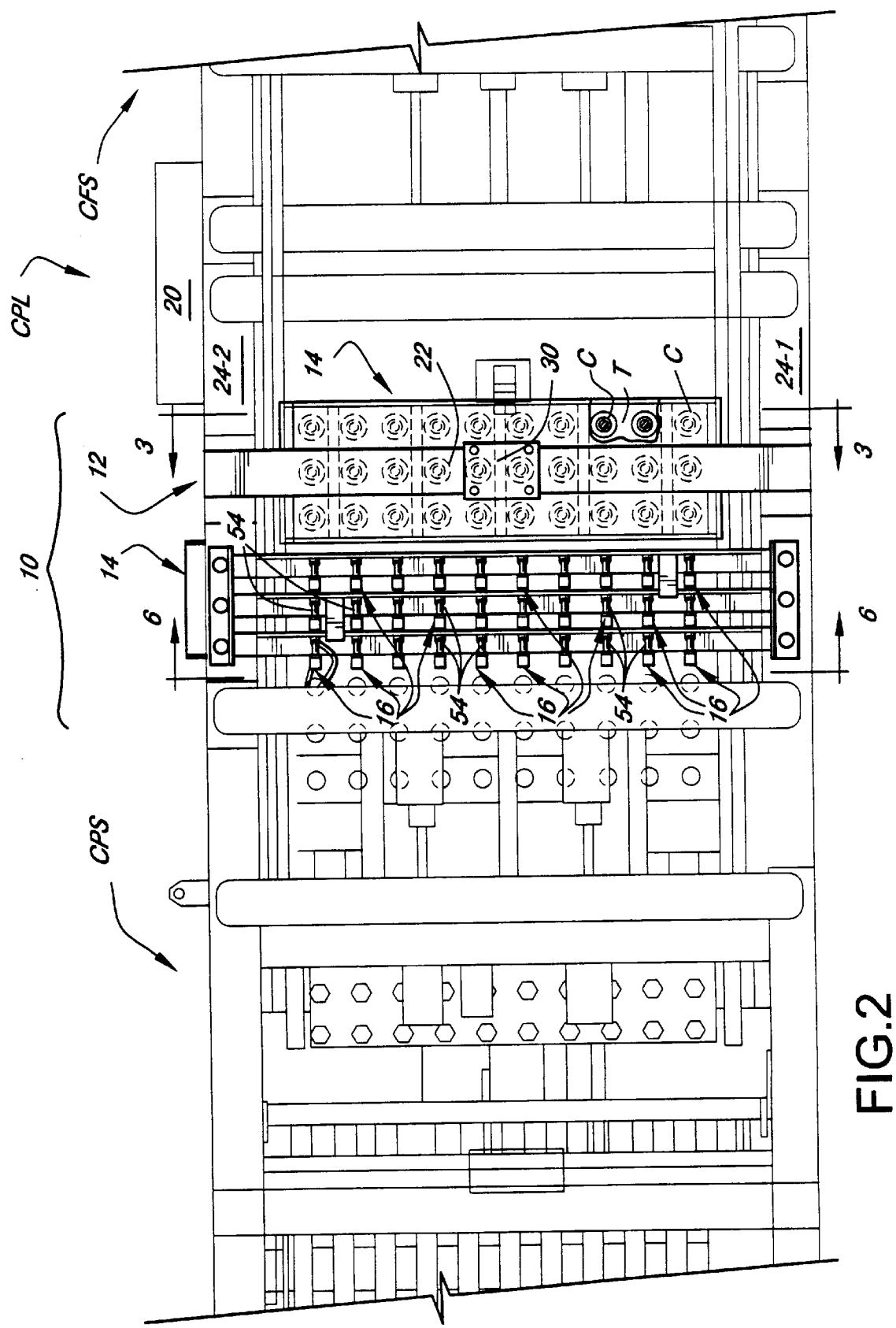

As shown in accompanying FIGS. 1 and 2, the pressure testing system 10 according to the present invention is generally comprised of a pressure testing station 12 and an ejector station 14 positioned in a container processing line CPL. In this regard, the testing and ejector stations 12, 14, respectively, are most preferably positioned in a container processing line CPL of the variety disclosed in the above-cited U.S. Patents downstream of the container forming station CFS (i.e., wherein flexible walled containers C, a few of which are depicted in the accompanying drawings as being dependently supported by a tray T) are formed from plastic billets) but upstream of the container packaging station CPS (i.e., wherein the thus formed containers C are removed from the trays for purposes of packing, palletizing, shipping and/or subsequent handling). The freshly formed containers C will thus be transported by their respective supporting trays T into the pressure testing station 12 for the purpose of performing pressure tests on each of the individual containers C. Any individual container which fails to maintain its pressurized state is tagged by a controller 20 (see FIG. 2) as being defective. Thus, when the tray T and its associated containers C are sequentially indexed into the downstream ejector station 14, those individual containers C which had been determined to be defective in the pressure testing station 12 are ejected downwardly from their supporting tray T by the ejector assemblies 16 and fall by gravity into the defect chute 18.

Figure 3:
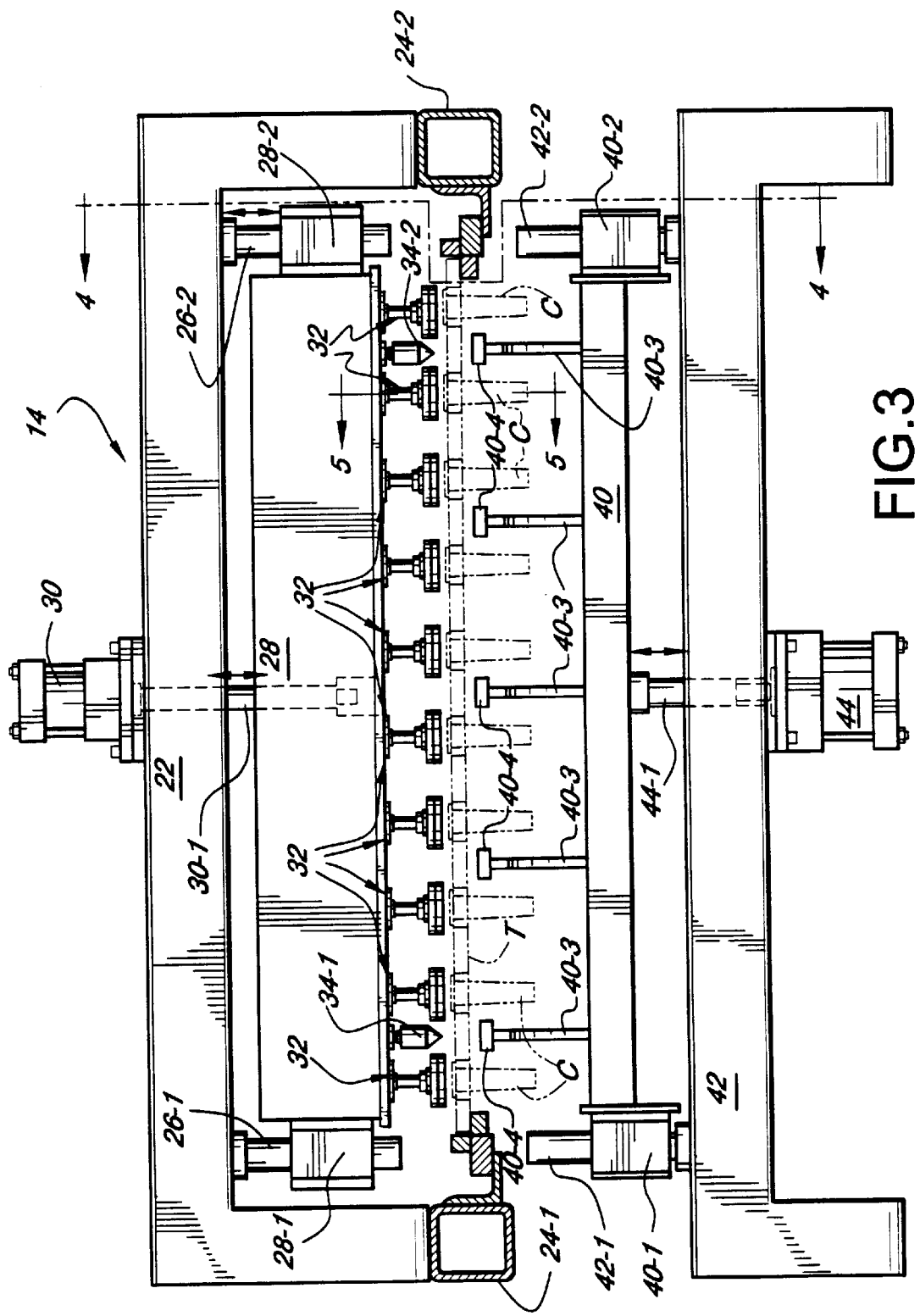
FIG. 3 is an enlarged front elevational view of the pressure testing station in accordance with the present invention as taken along line 3—3 in FIG. 2.
Figure 4:
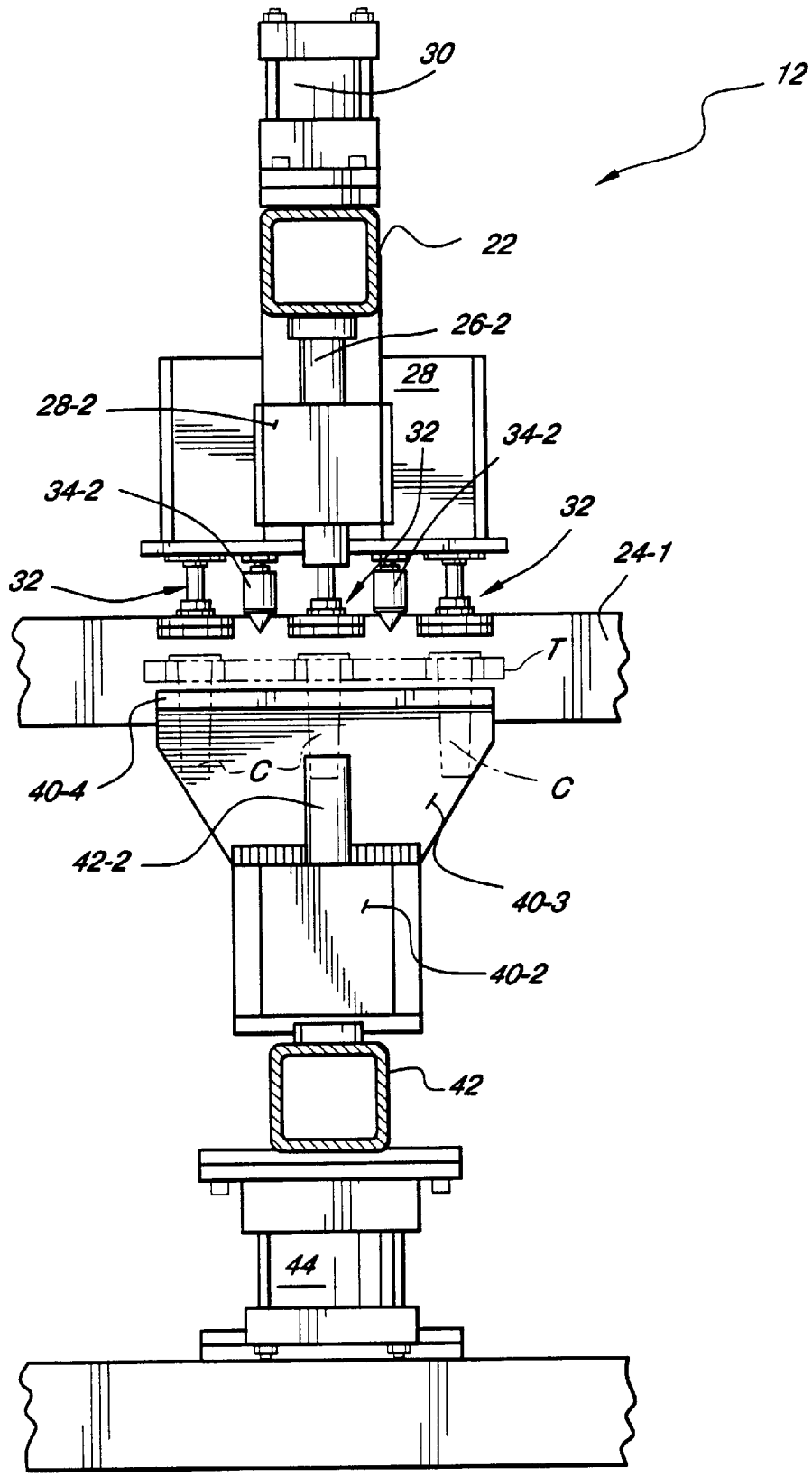
FIG. 4 is an enlarged side elevational view of the pressure testing station shown in FIG. 3 as taken along line 4—4 therein.
Figure 5:
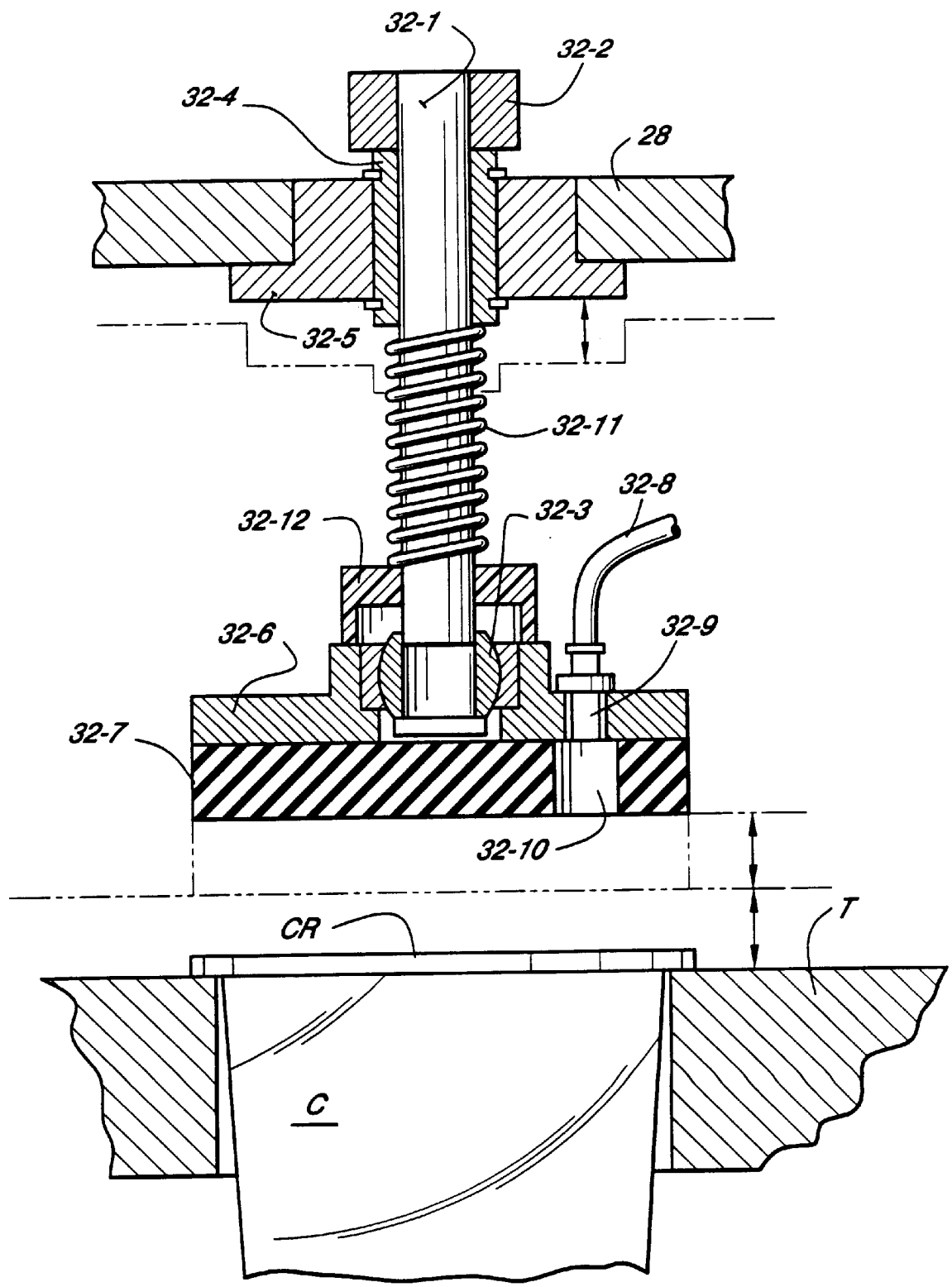
FIG. 5 is an enlarged elevational sectional view of a representative one of the pressure testing assemblies employed in the pressure testing station shown in FIG. 3 as taken along line 5—5 therein.

Accompanying FIGS. 3–5 show in greater detail the pressure testing station 14 and its associated structural components. As shown, the pressure testing station 14 includes a generally inverted U-shaped support frame 22 which is, in turn, rigidly supported by lateral frame members 24-1, 24-2. The pressure testing station 14 is thus dependently positioned in a cross-machine direction relative to the support trays T and the containers C supported thereby.

The support frame 22 includes a pair of guide rods 26-1, 26-2 depending therefrom which slidably cooperate with a respective one of the sleeve members 28-1, 28-2 of the manifold housing 28. The manifold housing 28 is, in turn, rigidly coupled to the actuator rod 30-1 of a pneumatically-activated control cylinder 30. Thus, in response to actuation of the cylinder 30, the manifold housing 28 is caused to move reciprocally towards and away from the support tray T and the containers C supported thereby. Although the control cylinder 30 is most preferably pneumatically-activated, other equivalent means may be provided, such as, for example, hydraulic or electro-mechanical actuators.

The manifold housing 28 carries a number of dependent pressure testing heads 32 which will be described in greater detail below. Suffice it to say here, however, that the testing heads 32 are each individually fluid-connected to a source of pressurized fluid (e.g., via the manifold housing 28) so that when the manifold housing 28 is moved towards the tray T (i.e., in a downward direction as viewed in FIGS. 3 and 4), the pressure testing heads 32 are each brought into physical contact with the upper rims of each container C. Thereafter, each individual container C may be pressurized and thereby tested for leakage by introducing a pressurizing fluid (e.g., air) into the container through the testing heads 32.

The manifold housing 28 also carries pairs of reciprocally movable position pins 34-1, 34-2 which are moveable reciprocally towards and away from the supporting tray T with movement of the manifold housing 28. As shown in drawing FIGS. 3 and 4, each of the position pins 34-1, 34-2 includes a conically shaped terminal end which coacts with a respective circular position aperture (not shown) formed in the surface of the tray T. Thus, in response to lowering of the manifold housing 28, the conically shaped terminal end of the position pins 34-1, 34-2 will register with a respective one of the position apertures (not shown) of the tray T thereby causing the tray T to shift slightly as needed and ensuring proper alignment between the testing heads 32 and their respective container C.

The testing assembly 14 is provided with a movable lower support frame 40. Specifically, the lower support frame 40 is supported on a lower frame member 42 so as to be positioned in a cross-machine direction below the trays T and their associated containers C. The lower support frame 40 carries a sleeve member 40-2, 40-3 at each of its ends. The sleeve members 40-1, 40-2 are, in turn, slidably coupled to guide rods 42-1, 42-2, respectively, so that the entire lower support frame 40 is reciprocally moveable towards and away from the tray T and the containers C carried thereby. In this regard, the lower support frame 40 is coupled rigidly to the actuator rod 44-1 of a pneumatically actuated cylinder 44. Thus, in response to actuation of the cylinder 44 (which most preferably occurs simultaneously with the actuation of the cylinder 30), the lower support frame 40 will be moved towards and away from the tray T.

The lower support frame includes a number of vertically oriented support plates 40-3 spaced apart from one another in the cross-machine direction. Each of the support plates 40-3, in turn, terminates in a horizontally disposed support flange 40-4. As is perhaps more clearly shown in accompanying FIG. 4, the support flanges 40-4 are substantially the same lengthwise direction (as measured in the machine direction) as the tray T. When the lower support frame 40 s raised toward the tray T, the support flanges 40-4 will come into contact with the lower surface of the tray T. At substantially the same time, the testing heads 32 will be brought into contact with the upper surface of the tray T as described above so as to perform individual pressure testing on the containers C carried thereby. In such a manner, therefore, the support flanges 40-4 will resist the downward forces applied to the tray T by the sensing heads 32 thereby preventing bowing of the tray T in the cross-machine direction (which bowing could result in inaccurate and/or incomplete pressure testing of the containers C carried near the center of the tray T).

An exemplary test head 32 employed in the pressure testing station 14 is shown in accompanying FIG. 5. As seen, the test head 32 includes a central shaft 32-1 which includes a head 32-2 at its proximal end and a ball joint 32-3 at its distal end. The shaft 32-1 is slidable received within a guide sleeve 32-4 which itself is rigidly connected to a support insert 32-5 associated with the manifold housing 28. The shaft 32-1 is therefore capable of reverse rectilinear movements relative to the guide sleeve 32-4.

The ball joint 32-3 is received within a circular backing plate 32-6. An elastomeric pad element 32-7 is joined to the lower surface of the backing plate 32-6. Most preferably, the elastomeric pad element 32-7 is formed of a solid (non-cellular) silicone rubber having about a 60 durometer hardness. A pneumatic line 32-8 is connected to the inlet port 32-9 of the backing plate. As shown, the inlet port 32-9 is in registry with a port 32-10 formed in the pad element 32-7. Thus, upon movement of the manifold housing 28 toward the tray T, the elastomeric pad element 32-7 will be brought into contact with the container rim CR being supported by the tray T. The elastomeric pad element 32-7 is further brought into sealing contact with the container rim CR by virtue of a compression spring 32-11 operating between the sleeve 32-4 and a distally located cap element 32-12. Furthermore, the slidably mounted shaft 32-1 and the ball joint 32-3 allow for three degrees of movement of the pad element 32-7. In this manner also, the pad element 32-7 is ensured to make a fluid-tight seal with the container rim CR. Furthermore, the ball joint 32-3, movable shaft 32-1 and spring 32-11 compensate each of the heads 32 in an array for small positional/height variations that may be present from container-to-container across the tray T.

Figure 6:
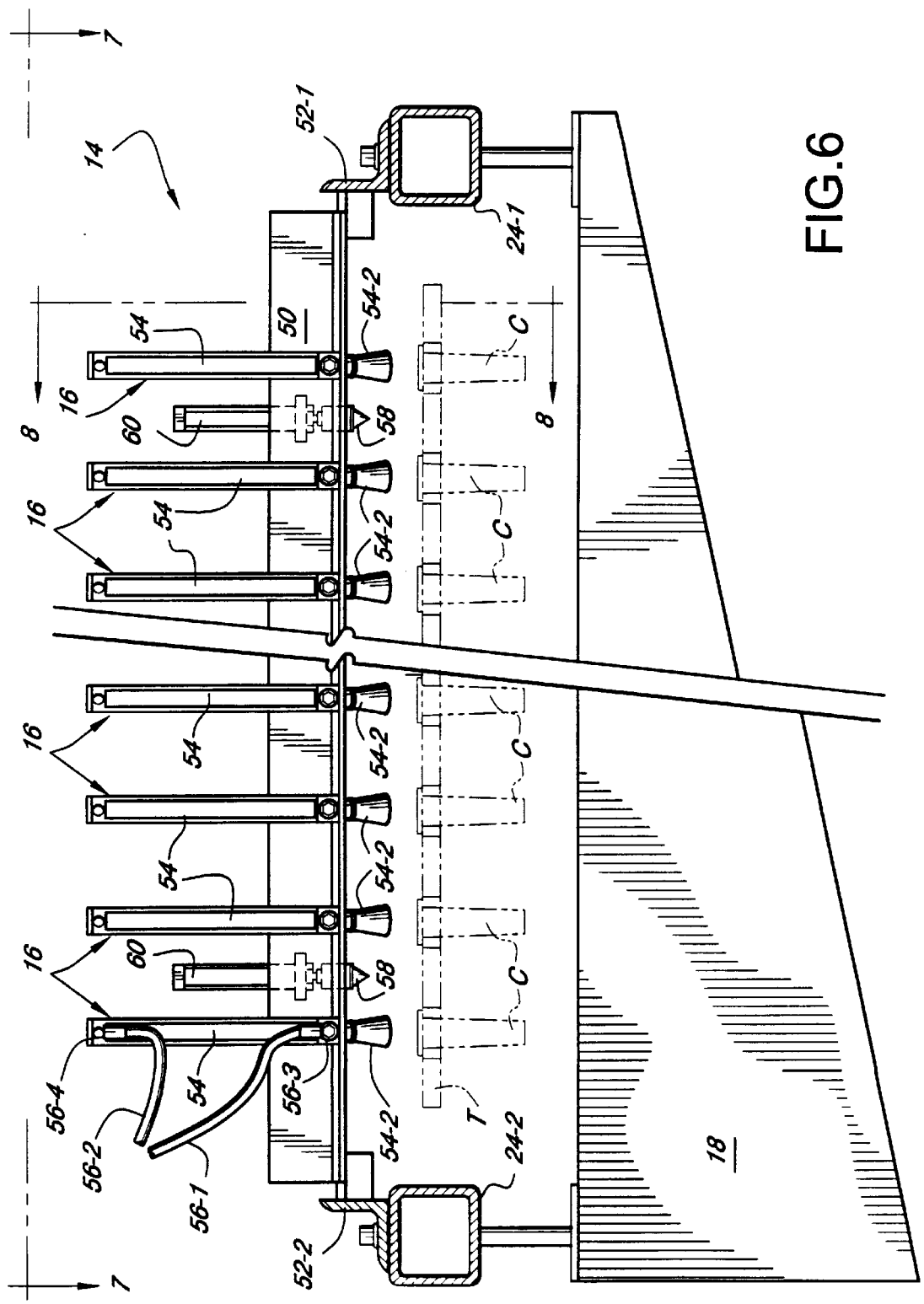
FIG. 6 is a rear elevational view of a container ejector station in accordance with the present invention as taken along line 6—6 in FIG. 2.
Figure 7:
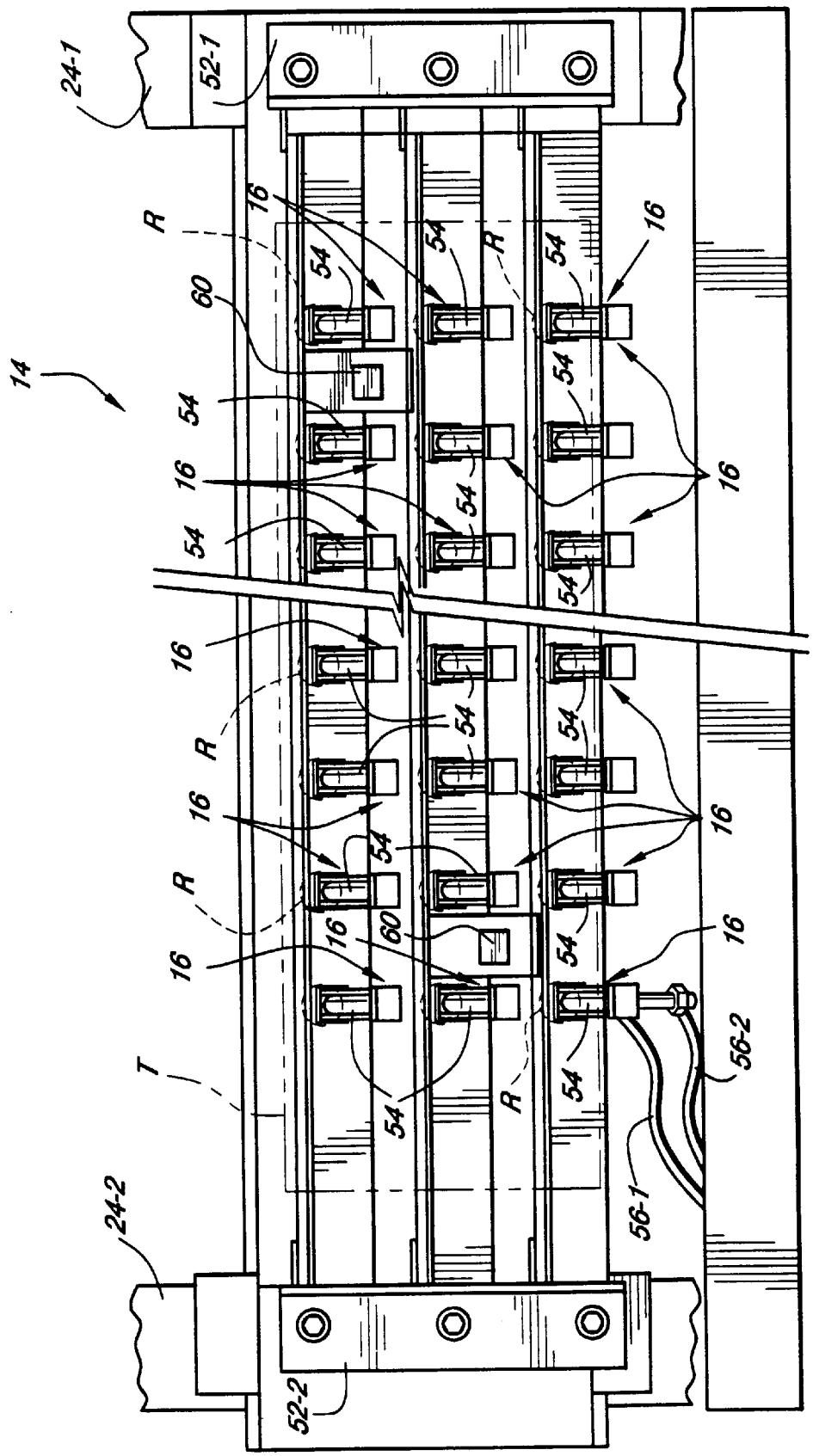
FIG. 7 is a top plan view of the ejector station shown in FIG. 6 as taken along line 7—7 therein.
Figure 8:
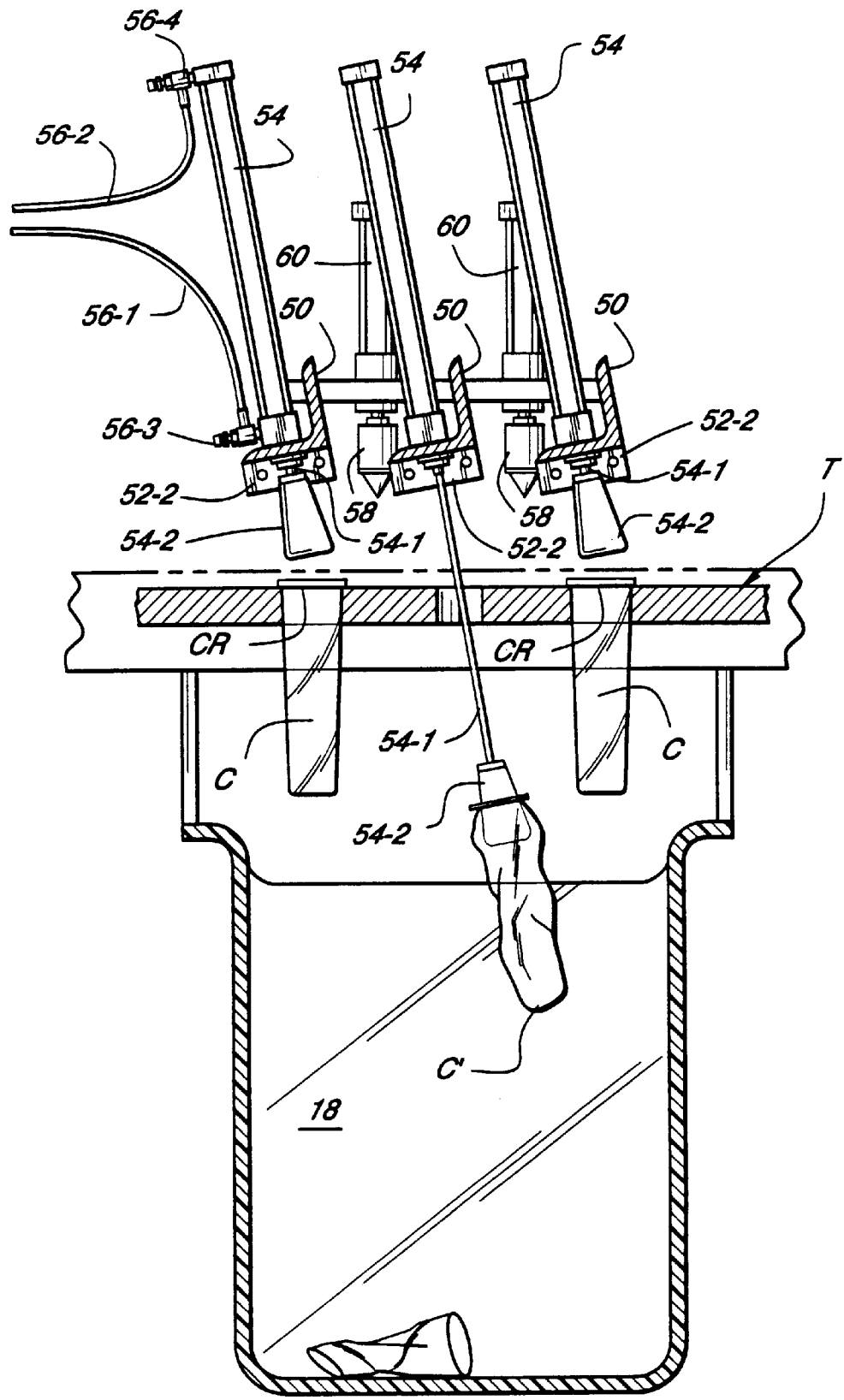
FIG. 8 is a side elevational view of the ejector station shown in FIG. 6 as taken along line 8—8 therein.

The ejector station 14 is perhaps more clearly depicted in accompanying FIGS. 6–8. As briefly noted above, the ejector station 14 includes an array of ejector assemblies 16 equal in number to the number of containers C carried by the tray T to be pressure tested. In this regard, the ejector assemblies 16 are supported in the cross-machine direction by cross-support members 50. The cross-support members 50 are, in turn, connected by mounting brackets 52-1, 52-2 to lateral frame members 24-1, 24-2, respectively. Each of the mounting brackets 52-1, 52-2 is canted so that the supports 50, and hence the ejector assemblies 16 mounted thereon, form an acute angle with respect to a vertical plane in the cross-machine direction. Preferably, the ejector assemblies form an angle of between about 5° to about 25°, and more preferably about 18°, relative to a vertical plane in the cross-machine direction.

Each of the ejector assemblies 16 include a double-acting pneumatic cylinder 54 which is coupled to an appropriate, independently controllable solenoid valve (not shown) located in the pneumatic control cabinet 56 (see FIG. 1) via pneumatic conduits (a representative pair of conduits 56-1, 56-2 being depicted in FIGS. 6–8 for clarity of presentation). Each of the conduits 56-1, 56-2 terminates in a respective manually controllable flow regulation valves 56-3, 56-4 to ensure that proper pneumatic fluid flow is supplied to the air cylinders 54. The cylinders 54 include an ejector rod 54-1 having a terminal end which carries an elastomeric ejector foot 54-2. On actuation of the cylinder 54, the ejector rod 54-1 will extend from its retracted position (where it is spaced above the tray T and the containers C supported thereby) and into its extended position (where the ejector foot 54-2 asymmetrically contacts the side wall of the container C and causes it to be pushed through the tray T and into the chute 18).

The ejector station also includes centering pins 58 which are connected to the actuator rod of pneumatic cylinders 60 and thus are extendable towards and away from the tray T. Like the pins 34-2 discussed above with respect to the pressure testing station 12, the terminal ends of the pins 58 associated with the ejector station 14 are conically shaped so as to engage a circular position aperture (not shown) formed in the surface of the tray T. The pins 58 thus serve to position the tray T, and the containers C carried thereby relative to the ejector feet 54-2 of the ejector assemblies 16 to ensure that defective ones of the containers C may reliably be removed from the process line.

In use, the tray T of containers C will be sequentially advanced under the pressure testing station 14 by the sequential positioning of an upstream one of the trays T exiting the container forming station CFS. The controller 20 will thereafter issue signals to the cylinders 30, 44 thereby causing the manifold housing 28 and the lower support 40 to be moved simultaneously towards the tray T. The pad elements 32-7 will therefore be brought into sealing contact with a respective container rim CR so that the containers C may be pressurized at or above a selected threshold pressure condition (e.g., about 2 psi) via the introduction of a pressurizing fluid (e.g., air) thereinto through the ports 32-9 and 32-10. The conduit 32-8 is connected to a pressure transducer (not shown) which is capable of detecting any inability of the containers C to achieve and/or maintain (e.g., after about 0.5 second subsequent to pressurization) the threshold pressure condition. If an inability of any individual one of the containers C to achieve and/or maintain the threshold pressure condition is detected, that individual container is then tagged by the controller 20 as a "defective container". When the pressure testing is completed, the controller 20 will cause the pressure testing heads 32 and the lower support structure 44 to be separated from the tray T so that it may advance on to the ejector station 14.

When positioned in the ejector station 14, the centering pings 58 will be activated to ensure proper positioning of the tray T relative to the ejector assemblies 16. Thereafter, the controller 20 will issue a signal corresponding to that one of the ejector assemblies 16 which is in registry with the defective container detected previously in the pressure testing station 12. Selective activation of that one ejector assembly 16 will therefore cause the ejector foot 54-2 to come into contact with the side wall of the defective container (noted in FIG. 8 by reference C') thereby forcing the container C downwardly through the tray T.

It will be observed that the ejector foot 54-2 asymmetrically contacts the container side wall when it is in its extended position due to the angular orientation of the ejector assemblies 16 relative to a vertical, cross-machine plane. This asymmetric contact therefore imparts an asymmetric downward force on the container rim CR in a region opposite the contact region between the ejector foot 54-2 and the container side wall. This asymmetric downward force thus causes the container rim CR to collapse inwardly toward the ejector rod 54-1 extending therethrough so that the entire container C may be pushed physically through the tray T.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus for the automated, in-line testing of flexible walled containers having a rim which dependently supports the containers on a tray, said apparatus comprising:

a pressure testing station for pressurizing the containers to a predetermined pressure condition;

an ejector station downstream of said pressure testing station for ejecting the defective container from the tray, said ejector station including ejector assemblies oriented at an angle relative to a vertical cross-machine plane and having a retracted position, wherein the ejector assembly is spaced above the container in registry therewith, and an extended position, wherein the ejector assembly contacts the flexible side wall of a container so as to forcibly push the container through the tray; and a controller for (i) determining whether any one of the containers is defective by an inability to maintain the pressure condition established at the pressure testing station, and (ii) moving a selected one of said ejector assemblies corresponding to said detected defective container from said retracted position and into said extended position to thereby cause the defective container to be pushed through the tray; wherein said ejector assemblies include an ejector foot which contacts the flexible side wall of the container when in said extended position and thereby causes an asymmetric force to be imparted to the container rim which inwardly collapses the container rim and allows the container to be pushed physically through the tray.

2. A process for the in-line testing of flexible walled rimmed containers comprising the steps of:
  (i) conveying to a container testing station a tray which has an array of containers to be tested, each said container including a rim which dependently supports the containers on the tray;
  (ii) subjecting the containers to a test at said pressure testing station to determine the presence of any defective container; and thereafter
  (iii) ejecting said defective container by asymmetrically contacting an interior side wall of the defective container with an ejector cause an asymmetric force to be imparted to the rim of the defective container and thereby force said defective container physically through said tray.

3. The apparatus as in claim 1, wherein the ejector assemblies are oriented at an angle of between about 5° to about 25° relative to a vertical cross-machine plane.

4. The apparatus as in claim 1, wherein the pressure testing station includes plural test heads having three degrees of movement.

5. The apparatus as in claim 1, wherein the pressure testing station includes:
  plural test heads which are movable into sealing contact with individual ones of the containers supported on the tray; and
  a lower support structure moveable into contact with the tray in opposition to said plural test heads.

6. Apparatus for the automated, in-line testing of flexible walled containers supported on a tray, said apparatus comprising:
  a pressure testing station for pressurizing the containers to a predetermined pressure condition;
  an ejector station downstream of said pressure testing station for ejecting the defective container from the tray, said ejector station including ejector assemblies having a retracted position, wherein the ejector assembly is spaced above the container in registry therewith, and an extended position, wherein the ejector assembly contacts the flexible side wall of a container so as to forcibly push the container through the tray; and
  a controller for (i) determining whether any one of the containers is defective by an inability to maintain the pressure condition established at the pressure testing station, and (ii) moving a selected one of said ejector assemblies corresponding to said detected defective container from said retracted position and into said extended position to thereby cause the defective container to be pushed through the tray: wherein
  said pressure testing station includes plural test heads which are movable into sealing contact with individual ones of the containers supported on the tray, and a lower support structure moveable into contact with the tray in opposition to said plural test heads; and wherein
  said controller moves said test heads and said lower support structure substantially simultaneously into contact with the tray.

7. Apparatus for the automated, in-line testing of flexible walled containers supported on a tray, said apparatus comprising:
  a pressure testing station for pressurizing the containers to a predetermined pressure condition;
  an ejector station downstream of said pressure testing station for ejecting the defective container from the tray, said ejector station including ejector assemblies having a retracted position, wherein the ejector assembly is spaced above the container in registry therewith, and an extended position, wherein the ejector assembly contacts the flexible side wall of a container so as to forcibly push the container through the tray: and
  a controller for (i) determining whether any one of the containers is defective by an inability to maintain the pressure condition established at the pressure testing station, and (ii) moving a selected one of said ejector assemblies corresponding to said detected defective container from said retracted position and into said extended position to thereby cause the defective container to be pushed through the tray; wherein
  said pressure testing station includes plural test heads which are movable into sealing contact with individual ones of the containers supported on the tray, and a lower support structure moveable into contact with the tray in opposition to said plural test heads; and wherein said test heads include:
  a vertically moveable support shaft;
  a backing plate;
  a ball joint which connects the backing plate to a distal end of the support shaft; and
  an elastomeric pad element affixed to said backing plate and capable of forming said sealing contact with the container.

8. The apparatus as in claim 7, wherein the test heads include a spring element for biasing the pad element into sealing contact with the container.

9. The apparatus as in claim 7, wherein the backing plate and elastomeric pad element include a pneumatic port which fluid-communicates with the container when the test head is brought into said sealing contact therewith so as to allow a pressurizing fluid to be introduced into said container.

10. Apparatus for the automated, in-line testing of flexible walled containers having rims which support the containers on a tray, said apparatus comprising:
  a pressure testing station for pressurizing the containers to a predetermined pressure condition;
  an ejector station downstream of said pressure testing station for ejecting the defective container from the tray, said ejector station including ejector assemblies having a retracted position, wherein the ejector assembly is spaced above the container in registry therewith, and an extended position, wherein the ejector assembly contacts the flexible side wall of a container so as to forcibly push the container through the tray; and
  a controller for (i) determining whether any one of the containers is defective by an inability to maintain the pressure condition established at the pressure testing station, and (ii) moving a selected one of said ejector assemblies corresponding to said detected defective container from said retracted position and into said extended position to thereby cause the defective container to be pushed through the tray; wherein
  said pressure testing station includes plural test heads which are movable into sealing contact with individual ones of the containers supported on the tray, and a lower support structure moveable into contact with the tray in opposition to said plural test heads; and wherein
  said ejector assemblies include an ejector foot which contacts the flexible side wall of the container when in said extended position and thereby causes an asymmetric force to be imparted to the container rim which inwardly collapses the container rim and allows the container to be pushed physically through the tray.

11. A pressure testing station for determining the presence of defective containers dependently supported on a tray, said pressure testing station comprising:
- (a) plural test heads each movable towards said tray so as to be brought into sealing contact with respective individual ones of the containers;
- (b) said test heads having a port for introducing a pressurizing fluid into said containers when in said sealing contact so as to establish a predetermined pressure condition therewithin;
- (c) said test heads having a vertically movable support shaft, a backing plate, a ball joint which connects the backing plate to a distal end of the support shaft, and an elastomeric pad element affixed to said backing plate and capable of forming said sealing contact with the container;
- (d) a controller for determining whether a container is defective by an inability of said container to maintain said pressure condition; and
- (e) a lower support structure moveable into contact with said tray in opposition to said plural test heads.

12. A pressure testing station as in claim 11, further comprising a drive system coupled operatively to said plural test heads and said lower support structure for moving said plural test heads and said lower support structure substantially simultaneously toward said tray in opposition to one another.

13. A pressure testing station as in claim 12, wherein said drive system includes pneumatic cylinders respectively operatively coupled to said plural test heads and said lower support structure.

14. A pressure testing station as in claim 11, wherein the test heads include a spring element for biasing the pad element into sealing contact with the container.

15. A pressure testing station as in claim 11, wherein the backing plate and elastomeric pad element include a pneumatic port which fluid-communicates with the container when the test head is brought into said sealing contact therewith so as to allow a pressurizing fluid to be introduced into said container.

16. A process as in claim 2, wherein step (ii) includes bringing test heads into contact with respective ones of the containers to be tested while substantially simultaneously bringing a lower support structure into contact with the tray in opposition to said test heads.

17. A process as in claim 16, wherein step (ii) includes bringing test heads into sealing contact with said respective ones of the containers to be tested, and thereafter establishing a pressure condition within said containers.

18. A process as in claim 2, which includes bringing a centering pin into contact with an aperture of the tray so as to ensure alignment of the tray relative to said testing station.

19. A process as in claim 2, wherein step (iii) is practiced at an ejector station downstream of said testing station.

20. A process as in claim 19, wherein step (iii) includes bringing an ejector foot into angular contact with the flexible side wall of the defective container to cause the rim to collapse inwardly and thereby force the container downwardly through the tray.

21. A process as in claim 20, wherein the ejector foot contacts the defective container side wall at an angle of between about 5° to about 25°.

22. A process as in claim 20, wherein the ejector foot contacts the defective container side wall at an angle of about 18°.

* * * * *